United States Patent [19]

Kawano

[11] Patent Number: 4,575,213

[45] Date of Patent: Mar. 11, 1986

[54] DEVICE FOR DISPLAYING DATA IN CAMERA VIEWFINDER

[75] Inventor: Kiyoshi Kawano, Tokyo, Japan

[73] Assignee: Asahi Kogaku Kogyo Kabushiki Kaisha, Tokyo, Japan

[21] Appl. No.: 621,660

[22] Filed: Jun. 18, 1984

[30] Foreign Application Priority Data

Aug. 8, 1983 [JP] Japan .................... 58-123202[U]

[51] Int. Cl.4 ............................. G03B 17/20
[52] U.S. Cl. ................... 354/474; 354/289.1
[58] Field of Search ................. 354/471–475, 354/155, 219, 224, 225, 289.1, 289.12; 352/171

[56] References Cited

U.S. PATENT DOCUMENTS 4,217,044 8/1980 Yamazaki et al. .............. 354/474

Primary Examiner—William B. Perkey
Attorney, Agent, or Firm—Sughrue, Mion, Zinn, Macpeak & Seas

[57] ABSTRACT

A device for displaying data in the viewfinder of a camera including a data film on which photographic data such as shutter speed is provided, and LED package including LEDs for illuminating the data on the data film and terminals of the LEDs, and a field frame. The LED package and the field frame are formed as a single unit by molding them with resin. As a result, it is not necessary to assemble separate components with a high precision, thereby significantly simplifying the assembly operation of the device.

3 Claims, 3 Drawing Figures

DEVICE FOR DISPLAYING DATA IN CAMERA VIEWFINDER

BACKGROUND OF THE INVENTION

The present invention relates to an improved data display device adapted to display photographing data such as shutter speeds in the viewfinder of a camera.

A conventional data display device of this type, as shown in FIGS. 1 and 2, includes a field frame 11, a data film 21, and an LED package 31. The field frame 11 is a thin plate having a rectangular opening 12 for defining the field of vision and a cut-out 13 formed in one side of the plate continuous with the opening 12. The data film 21 is a rectangular, transparent film corresponding in size to the cut-out 13. Data 22 such as shutter speeds are printed on the film 21. The LED package 31 is composed of LEDs 32, the number and positions of which correspond to those of the data 22 printed on the data film 21 and their terminals 33. The LEDs 32 and the terminals 33 are molded into a unit with resin.

The components 11, 21 and 31 are assembled as follows: As shown in FIG. 2, the data film 21 is fitted to the cut-out 13 of the field frame 11, and the LEDs 32 of the LED package 31 are accurately lined up with the data 22 of the data film 21. Under this condition, the components are joined together, for instance, using an adhesive. In this assembly operation, it is essential to position the three components with high precision. Accordingly, great care must be taken in positioning the components. Thus, the efficiency of the assembly operation is considerably low.

SUMMARY OF THE INVENTION

In view of the above-described difficulties accompanying a conventional device for displaying data in the viewfinder of a camera, an object of the invention is to provide a device for displaying data in the viewfinder of a camera with which it is unnecessary to adjust the positional relationship between the LED package and the field frame, and accordingly the assembly operation thereof is simple.

In accordance with this and other objects, a specific feature of the invention resides in that the LED package and the field frame are simultaneously formed as one unit with resin.

DESCRIPTION OF THE PREFERRED EMBODIMENTS

Figure 3:
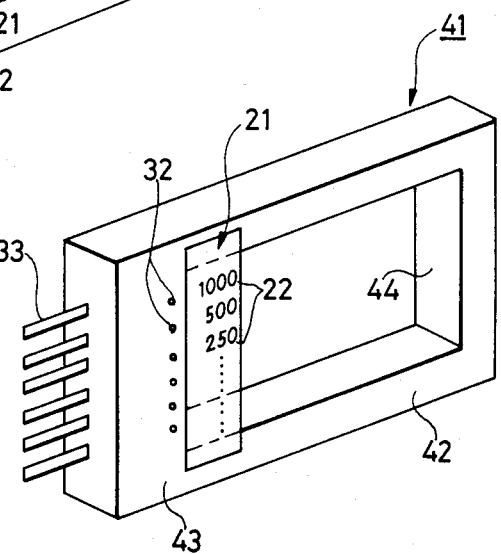
FIG. 3 is a perspective view showing an example of a device for displaying data in the viewfinder of a camera according to the invention.

The invention will be described with reference to preferred embodiments thereof as shown in FIG. 3.

Figure 1:
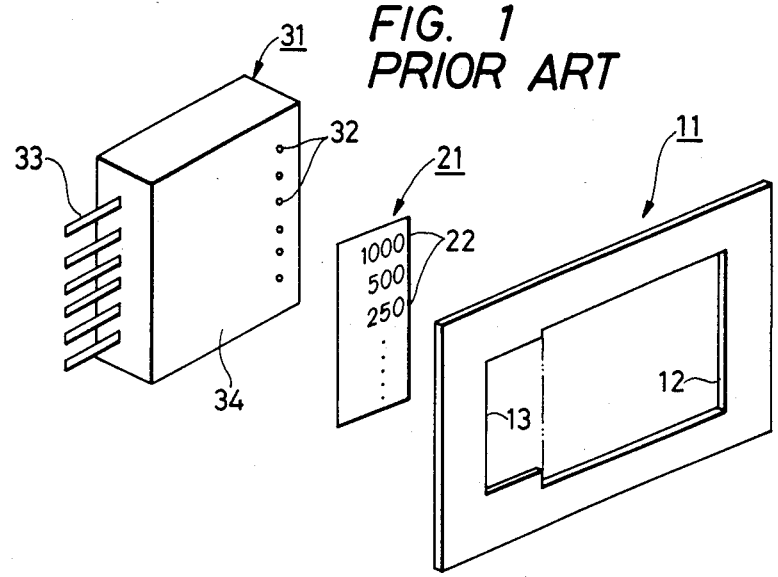
FIG. 1 is an exploded perspective view showing the components of a conventional device for displaying data in the viewfinder of a camera.
Figure 2:
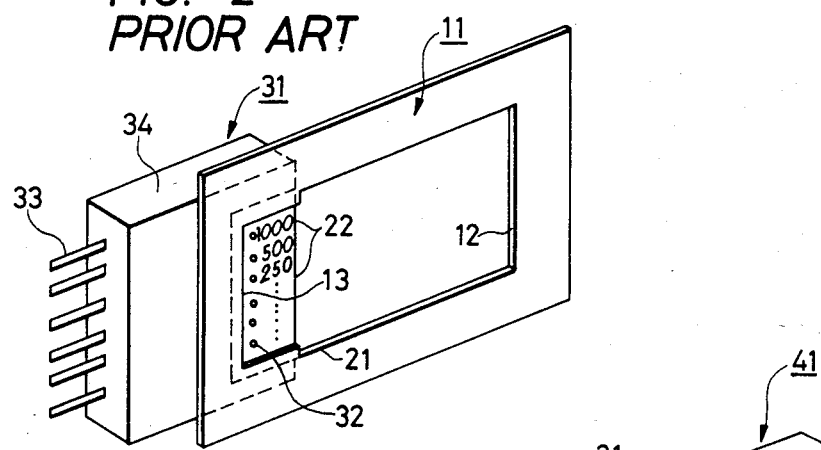
FIG. 2 is a perspective view of the components of FIG. 1 in the assembled state.

In FIG. 3, reference numeral 21 designates a data film, which is the same as the data film of the conventional device shown in FIGS. 1 and 2; and 31, a LED package which is, according to the invention, formed integrally with a field frame 42. The LED package 41 is formed as follows: LEDs 32 and their terminals 33 are molded with resin in such a manner that the LEDs 32 and the terminals 33 are fixedly secured by a package part 43 of resin. The package part 43 extends in a direction opposite to the direction in which the terminals 33 extend, thus forming a field frame 42 having a rectangular opening 44. The opening 44 defines the field of vision. The LEDs 32 are lined up on one side of the package part. As in the conventional device, the number and positions of the LEDs 32 correspond to those of the data 22 printed on the data film 21. According to a selected shutter speed, a corresponding one of the LEDs 32 is turned on to illuminate the respective datum 22.

The device of the invention is made up of only two components: the data film 21 and the LED package 41. The device can be assembled as follows. The data 22 of the data film 21 are lined up with the respective LEDs 32 of the LED package 41. Under this condition, the data film 21 is fixedly secured to the LED package 41, for instance, by using an adhesive. Accordingly, the assembly of the components of the device of the invention can be more readily achieved than in the conventional device.

In the above-described embodiment, the field frame 32 has a thickness the same as that of the package part 43 integral with the LEDs 32 and the terminals 33. However, the thickness of the field frame 42 may be made smaller or larger than that of the package part 43 according to the configuration of the part on which the device should be mounted.

As is apparent from the above description, in the device for displaying data in the viewfinder of a camera according to the invention, the LED package includes an integral field frame. Therefore, the device is made up of only two components: the LED package and the data film. Accordingly, the components can be readily positioned and assembled.

I claim:

1. A device for displaying data in the viewfinder of a camera, comprising:
    a data film on which photographic data is provided;
    an LED package including LEDs for illuminating said data on said data film and terminals of said LEDs; and
    a field frame, said LED package and said field frame being molded as a single unit with a resin, and said data film being fixedly secured to one side of said field frame.

2. The device for displaying data in the viewfinder of a camera of claim 1, wherein the thickness of said field frame is substantially the same as the thickness of said LED package.

3. The device for displaying data in the viewfinder of a camera of claim 1, wherein said photographic data comprises shutter speeds.

* * * * *